(12) United States Patent
Laracey et al.

(10) Patent No.: US 11,403,615 B2
(45) Date of Patent: Aug. 2, 2022

(54) AUTOMATIC SYNCHRONIZATION OF A DEVICE FOR TRANSACTION PROCESSING BASED ON GEO-FENCED LOCATIONS

(71) Applicant: PAYPAL, INC., San Jose, CA (US)

(72) Inventors: Kevin Laracey, Boston, MA (US); Douglas Hurst, Niwot, CO (US); Patrick Babcock, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 148 days.

(21) Appl. No.: 16/807,098

(22) Filed: Mar. 2, 2020

(65) Prior Publication Data

US 2020/0311710 A1 Oct. 1, 2020

Related U.S. Application Data

(63) Continuation of application No. 15/284,397, filed on Oct. 3, 2016, now Pat. No. 10,579,985.

(60) Provisional application No. 62/236,087, filed on Oct. 1, 2015.

(51) Int. Cl.
*G06Q 20/32* (2012.01)
*G06Q 30/02* (2012.01)

(52) U.S. Cl.
CPC ....... *G06Q 20/3224* (2013.01); *G06Q 20/327* (2013.01); *G06Q 20/3226* (2013.01); *G06Q 20/3278* (2013.01); *G06Q 30/0253* (2013.01)

(58) Field of Classification Search
None
See application file for complete search history.

(56) References Cited

U.S. PATENT DOCUMENTS

| 8,744,968 | B1* | 6/2014 | Grigg | G06Q 40/00 705/44 |
| 9,373,112 | B1 | 6/2016 | Henderson et al. | |
| 2013/0144785 | A1* | 6/2013 | Karpenko | G06Q 20/425 705/44 |
| 2016/0092858 | A1 | 3/2016 | Giles et al. | |

* cited by examiner

*Primary Examiner* — Jason Borlinghaus
(74) *Attorney, Agent, or Firm* — Haynes and Boone, LLP (57) ABSTRACT

There are provided systems and methods for automatic synchronization of a device for transaction processing based on geo-fenced locations. A merchant may geo-fence an area corresponding to the merchant's location where a user may visit to purchase an item. The merchant may provide multiple transaction processing and payment options at the merchant location, including payment applications with a mobile communication device. A payment provider may detect the location of the user and determine that the user's location matches the merchant's location through the geo-fenced area for the merchant. The payment provider may then configure a payment process for the user to utilize at the merchant location using payment mechanisms accepted at the merchant location. Where multiple merchants are located nearby, the payment provider may utilize additional known information for the user to select the most likely merchant for the user.

20 Claims, 5 Drawing Sheets

AUTOMATIC SYNCHRONIZATION OF A DEVICE FOR TRANSACTION PROCESSING BASED ON GEO-FENCED LOCATIONS

CROSS REFERENCE TO RELATED APPLICATIONS

This application is a continuation of U.S. patent application Ser. No. 15/284,397, filed Oct. 3, 2016, which claims priority to U.S. Provisional Patent Application Ser. No. 62/236,087, filed Oct. 1, 2015, which is incorporated by reference in their entirety.

TECHNICAL FIELD

The present application generally relates to electronic payment mechanisms and more specifically to automatic synchronization of a device for transaction processing based on geo-fenced locations.

BACKGROUND

Users may engage in transactions with merchants in order to purchase items. Traditionally, users were limited to physical payment mechanisms, which included cash or check. Modernly, credit cards and communication technologies have further allowed for additional payment instruments to be used at merchants that possess the proper acceptance mechanisms. However, as technology advances, payment mechanisms used in transactions may involve further processes, and merchants may begin to install or possess the proper infrastructure of various other types of payment instruments or mechanisms to effectuate a payment for a transaction. For example, near field communications (NFC) may allow a user to pre-load or request tokenized data that may be communicated to a merchant device for resolution by "tapping" or placing a communication device having the tokenized data near an NFC device for the merchant. Other methods of payment may also be accepted at certain merchants where the merchant possesses the proper acceptance mechanisms and tools. However, without being aware of the acceptance mechanism available with a merchant or at the merchant's location, the user may choose a merchant where the user cannot complete a transaction using the available payment tools to the user. Additionally, the user may encounter more friction choosing the proper payment tool to use with the merchant without knowledge of the merchant's acceptance mechanisms.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automatic synchronization of a device for transaction processing based on geo-fenced locations. Systems suitable for practicing methods of the present disclosure are also provided.

A payment provider may offer account services to various entities, which may include personal users and groups of users (e.g., companies), as well as merchants. The accounts with the payment provider may correspond to payment accounts, where a holder of the account may send and receive payments and otherwise engage in financial transactions. In order to establish a payment account, the payment provider may require information from the user, which may be stored as user data. The information may include personal and financial information, as well as other information that may be determined or requested from the user, including demographic information, preferences, interests, historical information, education, work, etc. Additionally, the user may specify authentication credentials, such as a login name, password, and/or personal identification number (PIN) for use of the payment account. The payment account may further be associated with a payment application executing on a communication device of the user. In various embodiments, the payment application may generally correspond to a web browser application accessing a website of the payment provider to process payments, or may correspond to a dedicated application of the payment provider executing on the communication device. Moreover, the communication device may include various payment processing components that may be used when processing payments with another device, such as a merchant device. Such payment processing components may include a communication module to provide short range wireless communications (e.g., Bluetooth Low Energy (BLE), Bluetooth, near field communications (NFC), WiFi, LTE Direct, radio, infrared, etc.) with a merchant, for example, to effectuate a check-in and/or provide a token. Other processing components may include an output display to display a barcode or QR code (e.g., having encoded payment information in the barcode or QR code, which may be encoded into the QR code or barcode by a payment application or a payment provider) and/or a GPS locator to associate the geo-location of the user with a geo-fenced area for a merchant.

A user may also generate user data, such as user actions of the user, which may be collected and stored by one or more devices of servers. The user data may therefore include user locations, travel routes, physical activity, or other data associated with where a user may be located at a specific time or during specific time periods. Additionally, the generated user data may correspond to transactions engaged in by the user with one or more merchants. The user data may include user search histories and other information indicating potential purchases or merchants of interest to the user. A service provider may collect data associated with the user's online transactions, social networking interactions, messages, connections, loyalty program information, and/or other available online actions by the user. Additionally, the user's communication device may generate user data corresponding to the user, which may include the user's personal/financial information, location (which may be determined in conjunction with a GPS locator of the user's communication device or other location determining system), biometrics, communications, etc. Such information may be used to generate past historical information and tendencies of the user, which may be useful for determining user interests, habits, and/or other defining information that may be used to determine a merchant location that the user may visit.

The payment provider may provide one or more types of payment instruments to a user through a digital wallet and accessible using the payment application of the communication device, which may be utilized by the user to pay for and complete a transaction with a merchant having acceptance mechanism(s) that match the payment instruments. Types of payment instruments may include payment accounts with the payment provider, financial accounts with other financial institutions, credit/debit cards, gift cards, and other types of funding sources. The payment application may utilize different interfaces and/or processes in order to provide and/or process each type of payment instrument for a transaction between the user and a merchant, and may utilize various components of the communication device in order to provide payment processing, such as the communication module, GPS locator, and/or display device.

These payment instruments may be used in a transaction through acceptance mechanisms that the merchant uses for acceptance of the payment mechanism. Acceptance mechanisms may include tokenized payments using a token that identifies data necessary to conduct a transaction. In this regard, a token may correspond to an identifier that identifies a user, a user account (e.g., a payment account with a payment provider), a payment instrument, a digital wallet (e.g., a digital representation of one or more payment instruments, or other entity that may provide a payment to a merchant. For example, a token may include an email address, account name, or other data element that represents something to be used for payment processing. The token may be communicated through an encrypted or unencrypted data transmission between a device for the user and a device for the merchant, which may be effected through near field communications, Bluetooth, Bluetooth Low Energy (BLE), WiFi, radio, magnetic field emissions, infrared, or other short range wireless technology. The merchant may perform payment processing using a received token, for example, by communicating the token with transaction information to a payment provider, which may process a payment to the merchant using the token (e.g., through identification of the user's account, payment instrument, digital wallet, etc.). Additionally, acceptance mechanisms used to accept payment information for a payment instrument used in a transaction may include scanning or otherwise entering a displayed code (e.g., alphanumeric, bar, image, and/or QR code) on a merchant device by the user's device, displaying a code on the user's device for entry to the merchant device, and location based check-in of the user for propagation of the merchant's information within a payment application and/or propagation of the user's information on a sales application of the merchant device. In such embodiments, a token may also correspond to the merchant, location, transaction, or other data necessary to identify the merchant and/or transaction, and provide a payment to the merchant for a transaction. Thus, a token in this respect may be entered to the user device and communicated to a payment provider for processing, which may further include transaction information where necessary.

For example, and as discussed herein, a check-in may correspond to a process associating the user with a specific location, such as a merchant location. The check-in process may be accomplished through detection of a geo-location of the user, which may utilize the GPS locator of the communication device or may allow the user to self-check in through selection of the merchant location or entering a location (e.g., location name, address, coordinates, etc.). In such embodiments, the payment provider may receive the user's geo-location and use a map having geo-fenced areas for merchants to determine a merchant for the user's geo-location by determining if the user's geo-location matches (e.g., is found within) a geo-fenced area for a merchant. The merchant may further break up a geo-fenced area into smaller geo-fenced areas each corresponding to a particular item offered by the merchant, such as a grocery store section, a particular gas pump at a gas station, and/or a particular merchant at a department store. The check-in may also be accomplished through short range wireless communications with a device at the merchant location, which may provide an identifier for the user to the device at the merchant location and/or retrieve a merchant identifier for the merchant from the device at the merchant location. Once checked-in, the user may be associated with the merchant location and one or more processes of the communication device and/or a payment provider server may provide user information to a merchant device for the merchant location or retrieve merchant information for use with the communication device.

Merchants may accept one or more of these acceptance mechanisms, which may allow the user to provide payment to the merchant using one or more payment instruments through the payment provider. For example, where a wallet token that identifies a digital wallet (e.g., with a payment provider) is communicated to a device for the merchant, the merchant may provide the wallet token to the payment provider for processing, which may be transmitted with transaction information. Once received, the payment provider may utilize the wallet token to identifier a payment account and any payment instruments stored to a digital wallet, and provide payment to the merchant using the merchant's acceptance mechanism(s) for payment. The acceptance mechanism may also be merchant specific and/or specific to a particular device at a merchant location. For example, a user may be associated with a gas station such that the user may effectuate a payment at a fuel pump where the fuel pump is preloaded with the user's information. In such embodiments, the gas station may geo-fence the fuel pump so that the user is detected at a particular gas pump and/or request that the user provide information at the fuel pump to identify the user or payment account. In other embodiments, the acceptance mechanism(s) for the merchant location may include a sale through tokenized payments using short range wireless communications (e.g., exchange of a token through short range wireless communications) or a token encoded to a barcode or QR code displayed by the communication device or the merchant device (e.g., a token identify a payment account, payment instrument, digital wallet, etc. displayed by a communication device, or a token identifying a merchant, merchant location, transaction, etc., displayed by a merchant device).

Thus, in order to select a user experience that assists the user in providing payment through the merchant's acceptance mechanism, the payment provider may use current user data and other available information to determine a merchant that the user may engage in a transaction with and which acceptance mechanism(s) the merchant utilizes. In various embodiments, the user may opt-in to allow the payment provider to utilize location based services to determine a location of the user. The payment provider may receive the location of the user (e.g., from a GPS locator of the communication device) and may match the location to a merchant. Geo-fences may be created at or around a merchant location, so that when the user's location crosses into a geo-fence, the user is associated with the merchant for the geo-fenced area. For example, a geo-fence for a gas station may correspond to the immediate vicinity surrounding the gas station's property. Thus, as the user drives into the geo-fence and crosses the border, the user may be associated with the gas station. In various embodiments, exiting the geo-fence may disassociate the user with the merchant and/or merchant location.

In other embodiments, the user may opt-in to allow short range wireless communications with merchant device (e.g., through BLE and the merchant device and/or a corresponding wireless beacon at the merchant location). The user's communication device may then link to the device at the merchant location and perform a check-in of the user, as previously discussed. The check-in may then establish the user at the merchant location and/or associated with the merchant device or wireless beacon connected to the communication device. Using the connection and/or check-in, the payment provider may then determine that the merchant associated with the merchant device or wireless beacon connected to the communication device is the merchant that the user may transact with for one or more items available from the merchant.

Additionally, where location based services and/or short range wireless communications are unavailable or the user's location may be associated with multiple merchants (e.g., in a crowded shopping mall), additional user data and information may be accessed and used to determine the merchant that the user may potentially engage in a transaction with for one or more items. Thus, based on the user's demographic information, the user may be more likely to shop at one merchant over another. For example, a single 25 year old male may be more likely to visit a sports store than an adjacent baby clothes store. In other embodiments, the user's history may assist in choosing the merchant location. Thus, if a user is nearby a restaurant that the user commonly visits for food, that restaurant may be chosen as the merchant over an adjacent sunglasses store that the user has never visited. Other past user information, available personal and/or financial information, and/or other user data may be used to determine the merchant that the user wishes to visit. In various embodiments, the user may be presented a menu through a graphical user interface of a device application of the user's communication device. The menu selection may have two or more of the nearby merchants that the user may visit. The user may then make a selection of the merchant that the user intends on visiting and may transact with. The user's selection may be stored for future use when the user is at or nearby the same or same types of merchants. Additionally, the merchants populated to the menu interface may include all nearby merchants, or a subset of nearby merchants that the user may visit based on known user information.

Once the merchant that the user may visit and/or transact with is determined, the user experience that should be utilized based on the merchant may be further determined. The user experience may correspond to a payment process to utilize the merchant's acceptance mechanism for a payment instrument during a transaction. Thus, the payment provider may determine which acceptance mechanisms are used at the merchant location, for example, from known information of the merchant, querying the merchant, and/or analysis of past merchant transactions and current device capabilities at the merchant location. Once an acceptance mechanism for the merchant location is determined, a payment process used with the acceptance mechanism may be determined for the user's communication device. The payment process may configure the user's communication device to utilize the acceptance mechanism. The payment process may be loaded or otherwise configure a device application on the communication device, such as a mobile payment application. Thus, if the acceptance mechanism at the merchant location includes a merchant device that scans a QR code displayed through a mobile payment application of the user's communication device, the payment process may set up the user's communication device to display a QR code during transaction processing. In other embodiments, the acceptance mechanism may configure the payment application to communicate with a merchant device over short range wireless communications, such as NFC to provide an electronic tokenized payment. Moreover, the acceptance mechanism may also load merchant information to the user's communication device for networked processing of a tokenized payment to the merchant. The communication device may execute a mobile device application that may receive the transaction details from user input, scanning of another code, or merchant device communications and receive QR code that may be scanned by the merchant device.

In further embodiments, the payment process may also or instead configure a merchant device at the merchant location. For example, the payment process may load user information for the user to a merchant device at the merchant location so that the merchant device may quickly checkout and process a payment for the user. The user information may further include a token used to perform payment processing. For example, the user may select and/or be informed of the payment instrument for a transaction at the merchant location, and may provide identification and/or authentication when processing a transaction through pre-loaded payment information to a merchant device. Such information may be represented by a token, which may be communicated to the merchant device. In other embodiments, a token may represent a digital wallet, where a cloud computing entity (e.g., a payment provider) selects a payment instrument or allows the user to decide on a payment instrument for payment processing (e.g., through a user experience, which may be performed through an application of the user's device). The merchant device may also be configured to communicate with the communication device over short range wireless communications or scan a displayed code.

In various embodiments, the merchant and/or the payment provider may further provide advertisements and/or coupons to the user for use at the merchant location on detection of the user at the merchant location. The advertisements and/or coupons may be communicated to the user through the user's communication device and displayed to the user for use during transaction processing. Moreover, the payment provider may further determine a list of nearby merchants, which may be shortened and/or ranked based on the most likely merchants that the user may transact with. Where an initially selected merchant is not correct, the user may request a change of merchant by the payment provider. The payment provider may then select a next best matching merchant from nearby merchants for the user based on the user data and merchant data for nearby merchants. The user may then approve the next merchant or request further search. The payment provider may execute similar steps as those described above to determine a payment process for the next requested merchant and further configure a communication device and/or merchant device to process payments. The payment provider may then utilize the information on past selected merchants and transactions by the user to intelligently select further prospective merchants transacting with the user.

Once the payment process is established, the communication device may utilize the payment process during a transaction with the merchant to provide payment through the merchant's acceptance mechanism. The merchant may then receive payment for the transaction using the acceptance mechanism and the payment process. The payment provider may receive a payment request to the merchant by the user from use of the payment process with the acceptance mechanism. The payment provider may provide payment to the merchant and/or to an account for the merchant using the user's payment instrument. Transaction information may include terms of the payment request. Further, the payment provider may provide a transaction history, such as a receipt, to the user and/or merchant for documenting the transaction. Additionally, while payment processing is occurring, media may be presented to the user, for example, through the user's communication device and/or on an output device nearby the user (e.g., a display device at a gas pump). The media may include advertisements, targeted information, and/or other types of audio, visual, and/or audiovisual content.

Figure 1:
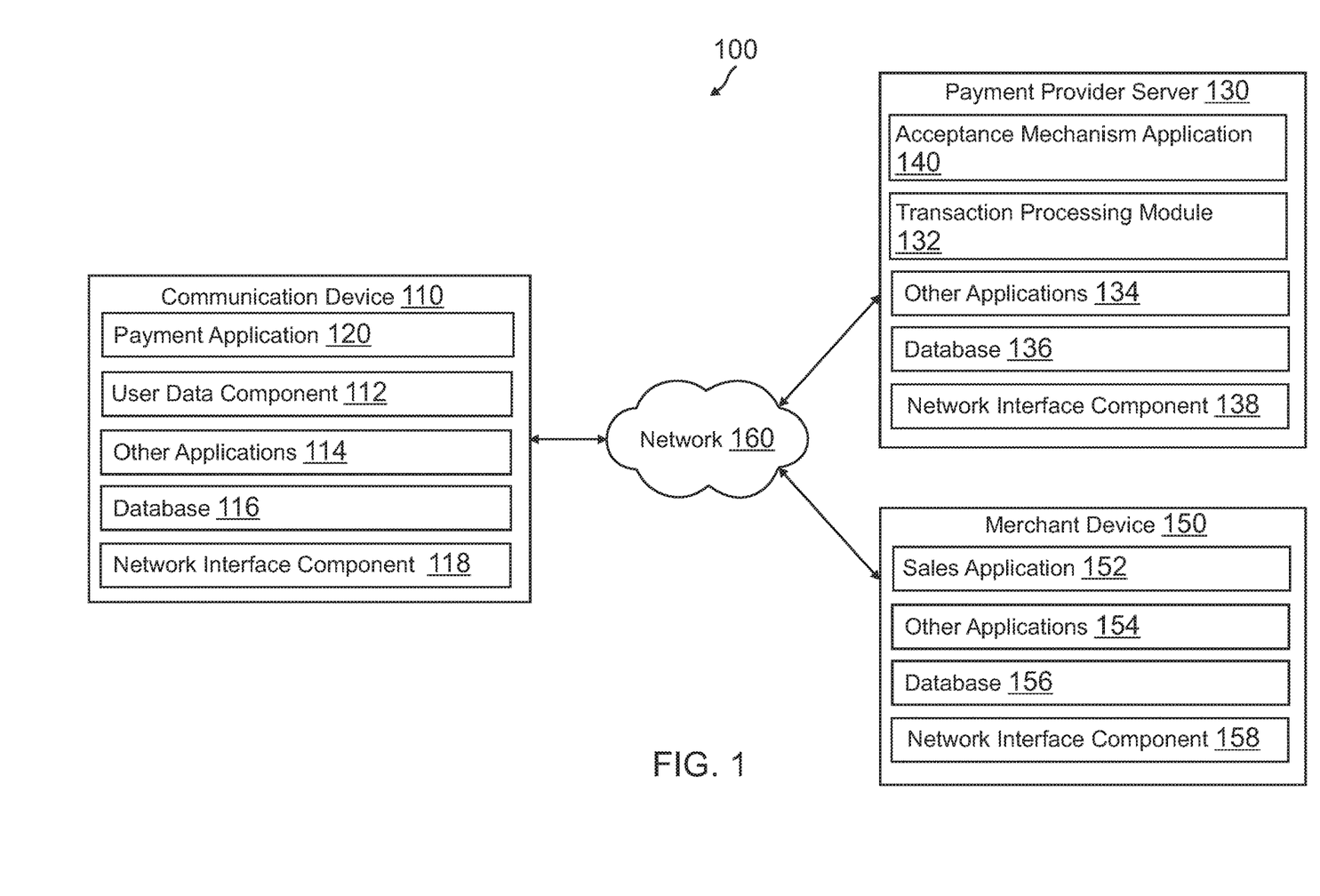
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a transaction management system 130, and a merchant device 150 in communication over a network 160. A user (not shown) may establish a payment account with transaction management system 130, which may be used to provide payments to a merchant (not shown) associated with merchant device 150. User data may be collected and/or determined by transaction management system 130. When the user data indicates that the user may shop with merchant device 150, transaction management system 130 may determine an acceptance mechanism by the merchant using merchant device 150 to receive payment using the payment account for the user and/or an instrument stored to transaction management system 130. Transaction management system 130 may then determine a payment process for use with the acceptance mechanism, which may be used to configure communication device 110 to interact with the acceptance mechanism of merchant device 150 and provide payment.

Communication device 110, transaction management system 130, and merchant device 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with transaction management system 130 and/or merchant device 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment application 120, a user data component 112, other applications 114, a database 116, and a network interface component 118. Browser/payment application 120 and other applications 114 may correspond to executable processes, procedures, and/or applications with associated hardware. In other embodiments, communication device 110 may include additional or different modules having specialized hardware and/or software as required.

Payment application 120 may correspond to one or more processes to execute modules and associated devices of communication device 110 to initiate, receive, and/or process/complete transactions using services provided by transaction management system 130. In this regard, payment application 120 may correspond to specialized hardware and/or software utilized by communication device 110 to provide an interface to permit the user associated with communication device 110 to select payment options and provide payment for items, for example, to a merchant through merchant device 150 using transaction management system 130. In various embodiments, payment application 120 may also provide payments and/or transfers to users and/or groups of users, for example, payments to individual sellers or friends for items and/or transfers between known associates. Payment application 120 may be implemented as a user interface enabling the user to enter payment options for storage by communication device 110, select and provide payment options on checkout/payment of one or more items with a merchant, and complete a transaction for the item(s) through a purchase request for the item(s). In various embodiments, payment application 120 may include a general browser application configured to retrieve, present, and communicate information over the Internet (e.g., utilize resources on the World Wide Web) or a private network. For example, payment application 120 may provide a web browser, which may send and receive information over network 170, including retrieving website information, presenting the website information to the user, and/or communicating information to the website, including payment information. However, in other embodiments, payment application 120 may include a dedicated application of transaction management system 130 or other entity (e.g., a merchant), which may be configured to assist in processing purchase requests.

As discussed herein, transaction management system 130 may be used to determine that the user associated with communication device 110 may visit and transact with the merchant associated with merchant device 150. Transaction management system 130 may then determine the acceptance mechanism used by the merchant, and may configure payment application 120 to utilize the acceptance mechanism during a payment process for a transaction between the user and the merchant. Transaction management system 130 may determine the payment process to use the acceptance mechanism, such as display of a code using payment application 120, imaging a code through communication device 110, establishing a check-in for the user, and/or loading user data (e.g., a token identifying the user or payment information for the user) to merchant device 150 or merchant data (e.g., a token identifying the merchant and/or a transaction between the user and a merchant) to payment application 120. Thus, payment application 120 may be configured to provide a payment to merchant device 150 through display or imaging a QR code, bar code, or other displayable code. In other embodiments, payment application 120 may communicate with merchant device 150 for transaction processing over a wireless connection configured by a payment process determine by transaction management system 130. Once a payment process configures payment application 120 for transaction processing with merchant device 150, the user of communication device 110 may utilize payment application 120 to process a payment for a transaction through one or more payment interfaces.

Payment application 120 may be utilized to select payment instrument(s) for use during a transaction between the user and the merchant associated with transaction management system 130. For example, the user may wish to complete a transaction with a merchant to purchase the item. Payment application 120 may utilize user financial information, such as a credit card, bank account, or other financial account, as a payment instrument when providing payment information for use in the authentication mechanism. In other embodiment, payment application 120 may provide a token that identifies the user, a digital wallet, and/or a payment instrument to merchant device 150 for use in transaction processing. Additionally, payment application 120 may utilize a user account with payment provider, such as transaction management system 130, as the payment instrument. The user may therefore generate a payment request to the merchant for one or more items for purchase in the transaction. The payment request may be communicated to transaction management system 130 for processing. In various embodiments, the payment request may include a token communicated to transaction management system 130 and/or merchant device 150 for processing, or received from merchant device 150. Payment application 120 may be utilized to view the results of the transaction and/or for viewing and storage of a transaction history, such as a receipt.

User data component 112 may correspond to one or more processes to execute modules and associated specialized hardware of communication device 110 that may be used to locally track user actions and other user data for the user and provide the user data to transaction management system 130. In this regard, payment application 120 may correspond to specialized hardware and/or software utilized by communication device 110 to collect, capture, and/or otherwise determine user data for the user by monitoring the user. The user data may correspond to locations of the user, which may further be determined using a location determination system, such as a GPS module of communication device 110 and associated systems. In other embodiments, the user's actions may correspond to biometrics, exercise data, and/or nutritional information, which may be input by the user and/or captured with the assistance of a connected device, such as a pedometer (e.g., a FITBIT® or similar device using a short range wireless communication with communication device 110). The user data may be provided to transaction management system 130 for use in determining that the user with visit the merchant associated with merchant device 150. In various embodiments, user data component 112 may determine the user data provided to transaction management system 130 using other applications and/or processes of communication device 110, including messaging applications (e.g., email, SMS/MMS, instant messaging, and/or social networking messaging), Internet browsers, Internet search engines, social networking applications, merchant and shopping applications, travel applications (e.g., travel fare reservation and purchasing applications including air travel, as well as local travel applications for utilizing subways, taxis, car rentals, and other transportation local to the user), and/or mapping applications. Additional user data captured by user data component 112 may include media viewing applications, video games, word processors and associated applications, and/or other types of modules, processes, and applications which may track and/or determine the user's actions. User data component 112 may then provide the user actions and other user data (e.g., personal, financial, and other user information) to transaction management system 130 for processing, such as determination of merchants that a user may transact with.

In various embodiments, one or more the discussed hardware and/or software features of browser/payment application 120 and user data component 112 may be included in the same module.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications. Other applications 114 may also include other location detection applications, such as a mapping, compass, and/or GPS application. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with browser/payment application 120 and/or other applications 114, identifiers associated with hardware of communication device 110, or other appropriate identifiers, such as identifiers used for payment/user/device authentication or identification. Database 116 may include location information and user data, which may be transmitted to transaction management system 130 and/or merchant device 150. A payment process for use with an acceptance mechanism may also be stored to database 116.

Communication device 110 includes at least one network interface component 118 adapted to communicate with transaction management system 130, and/or merchant device 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction management system 130 may be maintained, for example, by an online payment service provider, which may provide payment services and/or processing for financial transactions on behalf of users. In this regard, transaction management system 130 includes one or more processing applications which may be configured to interact with communication device 110, merchant device 150, and/or another device/server to facilitate payment for a transaction, including establishment of payment accounts and configuration of mobile device applications to use an acceptance mechanism for electronic payments by a merchant. In one example, transaction management system 130 may be provided by PAYPAL®, Inc. of San Jose, Calif., USA. However, in other embodiments, transaction management system 130 may be maintained by or include a credit provider, financial services provider, financial data provider, and/or other service provider, which may provide payment services to the user.

Transaction management system 130 of FIG. 1 includes acceptance mechanism application 140, a transaction processing module 132, other applications 134, a database 136, and a network interface component 138. Acceptance mechanism application 140, transaction processing module 132, and other applications 134 may correspond to executable processes, procedures, and/or applications with associated hardware. In other embodiments, transaction management system 130 may include additional or different modules having specialized hardware and/or software as required.

Acceptance mechanism application 140 may correspond to one or more processes to execute modules and associated specialized hardware of transaction management system 130 to receive and/or transmit information from communication device 110 for use in determining one or more merchants that the user associated with communication device 110 may transact with, determining an acceptance mechanism for payment used by the merchant(s), determining a payment process to configure communication device 110 with to use the acceptance mechanism, and configuring communication device 110 to use the payment process. In this regard, acceptance mechanism application 140 may correspond to specialized hardware and/or software to access user data and determine that the user associated with communication device 110 may interact with the merchant associated with merchant device 150 for the purpose of engaging in a transaction to purchase one or more items. For example, acceptance mechanism application 140 may determine that the user is located at a merchant location or traveling to the merchant location based on location services of communication device 110. In embodiments where the user is nearby multiple merchants, past user data, demographics, or other information may be used to determine the merchant. In order to determine that a user is at or nearby a merchant location, acceptance mechanism application 140 may access or receive geo-fencing information for merchants, for example, from merchant data. For example, a geo-location may be detected for the user and found within a geo-fenced area for a merchant (e.g., on a map of merchants each having geo-fenced areas). Thus, the user may be associated with that merchant location. In other embodiments, a third party resource may perform the matching of the geo-location detected by communication device 110 to a geo-fenced area for the merchant associated with merchant device 150. The merchant data may further include merchant information (e.g., type, brand, sales, name, shopper demographics, etc.) in order to determine whether the merchant matches the user.

Once detected at a merchant location, acceptance mechanism application 140 may further determine that the merchant utilizes a specific acceptance mechanism. For example, acceptance mechanism application 140 may access payment data for the merchant, which may include accepted payment mechanisms at the merchant location, such as payment through barcode/QR code displays having an encoded token, short range wireless communications and digital tokens, and/or check-in and loading of user/merchant information to a payment application for networked payment processing. If the merchant accepts multiple payment acceptance mechanisms, acceptance mechanism application 140 may match the acceptance mechanisms to payment mechanisms utilized by communication device 110. Moreover, a "favorite" or most used payment mechanism of the user associated with communication device 110 may be selected, or a fastest (e.g., payment processing time) acceptance mechanism may be selected. Using the acceptance mechanism, acceptance mechanism application 140 may configure payment application 120 of communication device 110 to use the acceptance mechanism in a payment process for a transaction. Payment application 120 may be configured prior to arriving at the merchant location or engaging in the transaction.

Transaction processing module 132 may correspond to one or more processes to execute modules and associated specialized hardware of transaction management system 130 to receive and/or transmit information from communication device 110 for establishing payment accounts, as well as processing and completing of one or more funding transactions initiated using the payment accounts. In this regard, transaction processing module 132 may correspond to specialized hardware and/or software to establish payment accounts, which may be utilized to send and receive payments and monetary transfers and engage in other financial transactions. A user associated with communication device 110 may establish a payment account with transaction processing module 132 by providing personal and/or financial information to transaction management system 130 and selecting an account login, password, and other security information. The payment account may be used to send and receive payments. The payment account may be accessed and/or used through a browser application and/or dedicated payment application executed by communication device 110. Transaction processing module 132 may receive a payment request from communication device 110 and/or merchant device 150 for a transaction between the user and the merchant, which may include identifiers, tokens, or other data used for transaction processing. The payment request may include transaction terms and a token, identifier, authentication information, or other data necessary for the payment process configured on communication device 110 for use with the merchant's acceptance mechanism. Thus, the payment request may be generated by using the payment process with the acceptance mechanism. Transaction processing module 132 may provide payment to the merchant using the payment instrument, and may provide a transaction history to communication device 110, merchant device 150, or store the history with one or more accounts.

In various embodiments, transaction management system 130 includes other applications 134 as may be desired in particular embodiments to provide features to payment provider server 134. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing payment provider server 134. In various embodiments where not provided by transaction processing module 132, other applications 134 may include connection and/or communication applications, which may be utilized to communicate information to over network 160.

Additionally, transaction management system 130 includes database 136. As previously discussed, the entity corresponding to merchant device 150 may establish one or more payment accounts with transaction management system 130. Payment accounts in database 136 may include entity information, such as name, address, birthdate, payment/funding information, additional user financial information, and/or other desired user data. The entity may link to their respective payment accounts through an account, user, merchant, and/or device identifier. Thus, when an identifier is transmitted to transaction management system 130, e.g., from communication device 110 and/or merchant device 150, a payment account belonging to the entity may be found.

In various embodiments, transaction management system 130 includes at least one network interface component 138 adapted to communicate communication device 110 and/or merchant device 150 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant device 150 may be maintained, for example, by a merchant having a physical retail location where a user may purchase one or more items. In this regard, merchant device 150 may include a device having processing applications, which may be configured to interact with communication device 110 and/or transaction management system 130 to engage in transactions. Merchant device 150 may be implemented using any appropriate hardware and software configured for wired and/or wireless communication with communication device 110 and/or transaction management system 130. For example, in one embodiment, merchant device 150 may be implemented as a single or networked personal computer (PC), a smart phone, laptop computer, wearable computing device, and/or other types of computing devices at a merchant location capable of transmitting and/or receiving data. Although only one merchant device is shown, a plurality of merchant devices may function similarly.

Merchant device 150 of FIG. 1 contains a sales application 152, other applications 154, a database 156, and a communication module 158. Sales application 152 and other applications 154 may correspond to processes, procedures, and/or applications executable by a hardware processor, for example, a software program. In other embodiments, merchant device 150 may include additional or different modules having specialized hardware and/or software as required.

Sales application 152 may correspond to one or more processes to execute modules and associated specialized hardware of merchant device 150 that provide checkout and payment processes for a transaction to purchase one or more items for sale from the merchant corresponding to merchant device 150. In this regard, sales application 152 may correspond to specialized hardware and/or software of merchant device 150 to provide a convenient interface to permit a merchant to enter, view, and/or edit items and/or services for purchase by a user. For example, sales application 152 may be implemented as an application having a user interface enabling the merchant to enter item information and request payment for a transaction on checkout/payment of one or more items/services. In certain embodiments, sales application 152 may correspond more generally to a web browser configured to view information available over the Internet or access a website corresponding to the merchant and/or payment provider server 140. Thus, sales application 152 may provide item sales through an online marketplace using the website of the merchant. Sales application 152 may include a corresponding acceptance mechanism that is used to accept payment for a transaction and process the transaction by sending a payment request to transaction management system 130 and/or communication device 110. The acceptance mechanism may correspond to display or receipt of displayable codes, short range wireless communications, location-based check-ins and determination of user or merchant information, or other acceptance mechanism to accept an electronic payment. Information on acceptance mechanisms may be retrievable by transaction management system 130 for purposes of configuring payment application 120 of communication device 110 to interact with sales application 152.

Once a payment amount is determined for a transaction for items to be purchased by a user associated with communication device 110, sales application 152 may request payment from the user using the acceptance mechanism. The mechanism may correspond to a displayable code having an encoded token, digital credentials, digital token, and/or required information determined by communication device 110 and/or transaction management system 130 for the payment instrument. Thus, the information in the mechanism may be used to authenticate the user and allow for payment. Sales application 152 may receive the mechanism from a scan of a displayed code, entry of input of information, and/or receipt of a short range wireless communication. Thus, sales application 152 may be used to scan the information, input the information using an input device, image the information with a camera or video recorder, detect the location, record an audio recording with a microphone, capture a biometric using a sensor, or otherwise input the information. The provided payment information may be communicated to transaction management system 130 with the transaction and transaction information by sales application 152 for approval. As discussed herein, payment provider server 150 may process the transaction with the provided token and determine whether to approve or decline the transaction using a payment instrument for the payment process used with the acceptance mechanism. Sales application 152 may then receive the results of the transaction processing, and complete the transaction with the user, for example, by providing the user the items for the transaction or declining the transaction where the user is not authenticated or the transaction is not authorized (e.g., insufficient funds).

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over network 160, or other types of applications. Other applications 154 may also include email, texting, voice and IM applications that allow a user to send and receive emails, calls, texts, and other notifications through network 160. In various embodiments, other applications 154 may include financial applications, such as banking, online payments, money transfer, or other applications associated with transaction management system 130. Other applications 154 may contain software programs, executable by a processor, including a graphical user interface (GUI) configured to provide an interface to the user.

Merchant device 150 may further include database 156 which may include, for example, identifiers such as operating system registry entries, cookies associated with sales application 152 and/or other applications 154, identifiers associated with hardware of merchant device 150, or other appropriate identifiers, such as identifiers used for payment/user/device authentication or identification. Identifiers in database 156 may be used by a payment/credit provider, such as transaction management system 130, to associate merchant device 150 with a particular account maintained by the payment/credit provider. Database 156 may further include transaction information and/or results.

Merchant device 150 includes at least one communication module 158 adapted to communicate with communication device 110 and/or transaction management system 130. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
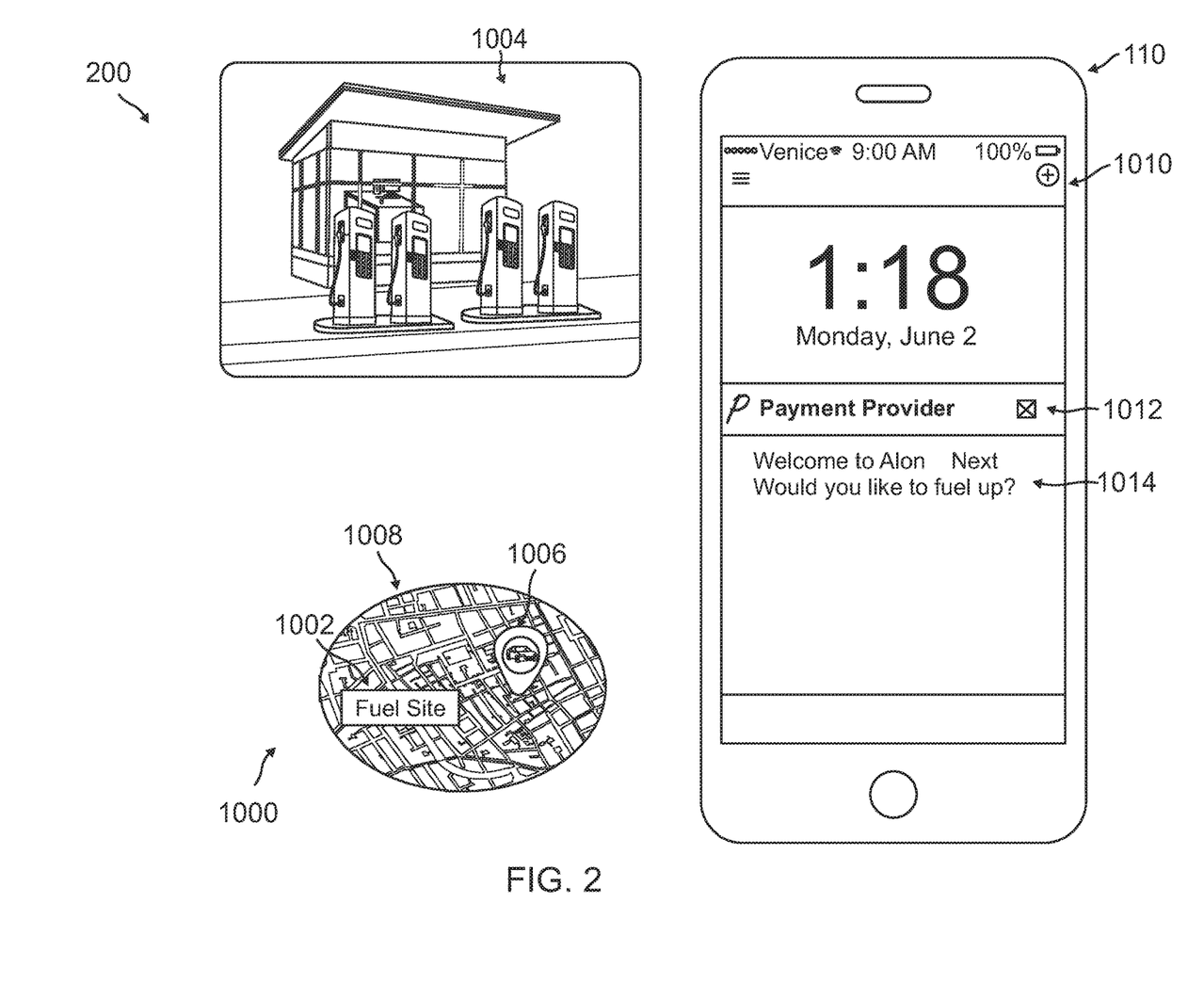
FIG. 2 is an exemplary geo-fenced merchant location to provide a user experience on a mobile device, according to an embodiment.

FIG. 2 is an exemplary geo-fenced merchant location to provide a user experience on a mobile device, according to an embodiment. In environment 200 of FIG. 2, a fuel site is shown with a geo-fence so that the user with their communication device is associated with the fuel site merchant when the user crosses the geo-fence. Moreover, environment 200 of FIG. 2 further includes communication device 110 discussed in reference to environment 100 of FIG. 1.

As shown in environment 200, a map 1000 may include one or more merchant locations, such as a fuel location 1002 and a coffee location 1004. In this regard, users may wish to visit one or more of fuel location 1002 and coffee location 1004 in order to transact with the merchant(s) to purchase one or more items. The users may wish to utilize a payment application executing on a communication device. However, establishing a connection and/or retrieving merchant information in order to provide a payment to one of the merchants may be time consuming and difficult, and thus, the users may choose to use other payment instruments, such as cash or a physical payment card.

In this regard, a payment provider (not shown) may configure communication device 110 based on detection of communication device 110 at fuel location 1002 or coffee location 1004. By configuring communication device 110, a payment application executing on communication device 110 may be ready to checkout and pay for a transaction using payment acceptance mechanisms available at fuel location 1002 or coffee location 1004. Thus, in order to determine where a user is located at, the payment provider may receive a user geo-location 1006. User geo-location 1006 is shown on map 1000. Moreover, the payment provider may associate user geo-location 1006 with a merchant through geo-fenced areas of the merchant. For example, map 1000 further includes a geo-fencing 1008 around fuel location 1002. Thus, it may be determined that the user located at user geo-location 1006 is at fuel location 1002 and ready to purchase fuel.

In this regard, the payment provider may determine one or more payment acceptance mechanisms available at fuel location 1002. One such acceptance mechanism may include payment through a payment application executing on communication device 110, for example, through short range wireless communications (e.g., NFC between communication device 110 and a merchant device, such as a fuel pump), QR code/barcode scanning of encoded payment information, and/or check-in and networked payments to the merchant. Once an acceptance mechanism is selected, the payment provider may configure communication device 110 to utilize the acceptance mechanism and alert the user that the payment application of communication device 110 is ready to transact with the merchant for fuel location 1002. Thus, an interface 1010 of communication device 110 may alert the user that a payment provider 1012 is reached to process a transaction 1014 and provide a payment to the merchant through the payment application.

Figure 3:
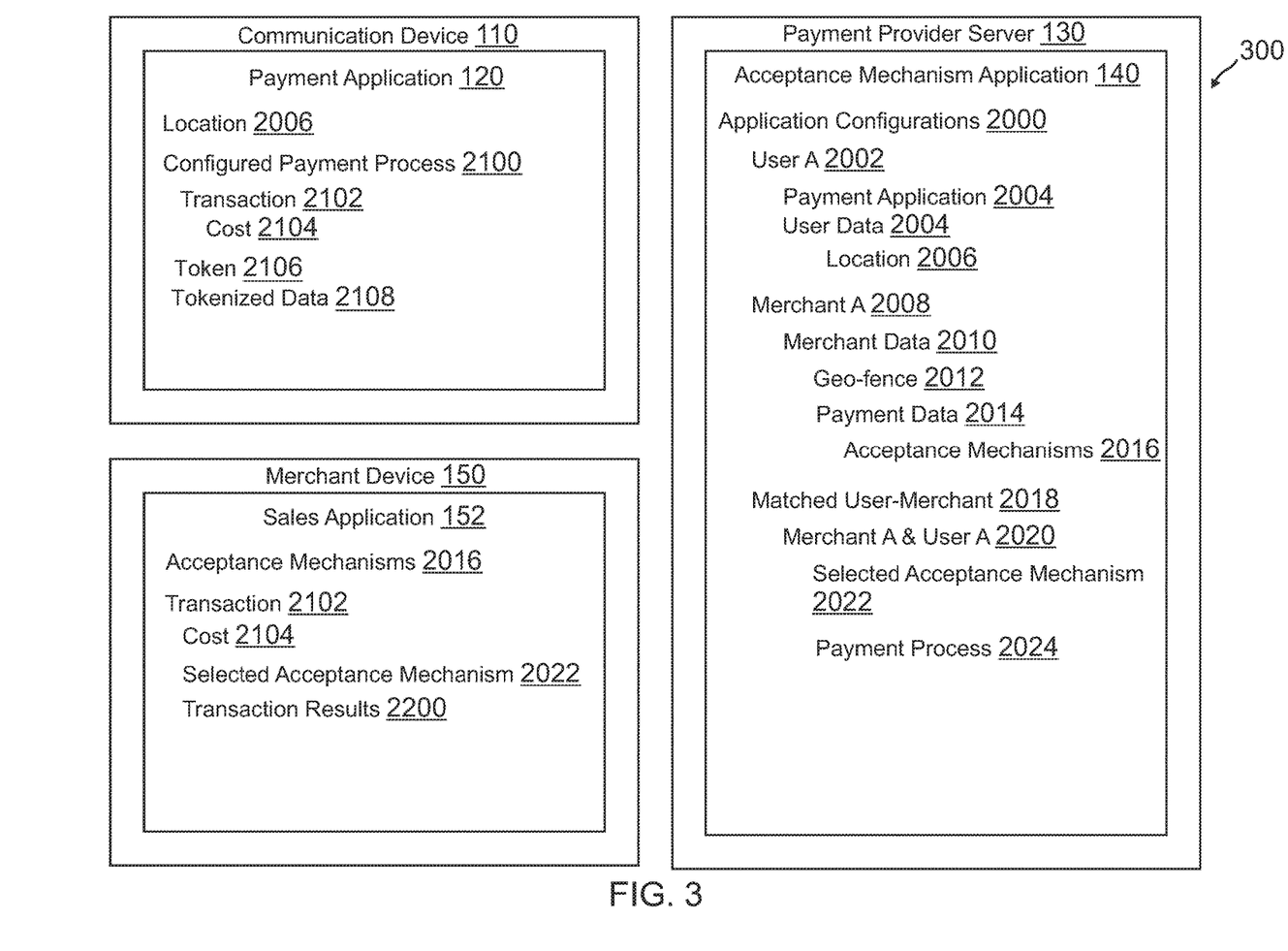
FIG. 3 is an exemplary system environment having a communication device configured to payment processing with a merchant device by a payment provider server based on accepted payment mechanisms for the merchant device, according to an embodiment.

FIG. 3 is an exemplary system environment having a communication device configured to payment processing with a merchant device by a payment provider server based on accepted payment mechanisms for the merchant device, according to an embodiment. Environment 300 of FIG. 3 includes a communication device 110, a transaction management system 130, and a merchant device 150 corresponding generally to described devices and associated features found in system 100 of FIG. 1.

Transaction management system 130 executes an acceptance mechanism application 140 corresponding generally to the specialized hardware and/or software modules and processes described in reference to FIG. 1. In this regard, acceptance mechanism application 140 may be used to determine a payment acceptance mechanism for communication device 110 to utilize with merchant device 150 during transaction processing and generate a payment process to configure communication device 110 to utilize the payment acceptance mechanism. Thus, payment acceptance application 140 includes application configurations 2000. Application configurations 2000 includes information for a user A 2002 corresponding to communication device 110 and a merchant A 2008 corresponding to merchant device 150.

For example, user A 2002 includes information for payment application 120 executing on communication device 110, such as processes and features requiring configuration to utilize an acceptance mechanism used by merchant device 150. Moreover, user A 2002 includes user data 2004, which includes at least a location 2006. In further embodiments, user data 2004 may further include user preferences, purchase history, previous merchant locations visited, and/or user information. Merchant A 2008 may include merchant data 2010 for matching to user data 2004. For example, merchant data 2010 includes a geo-fence 2012 for merchant A 2008, such as an established area for merchant A 2008 that may correspond to a merchant location. Geo-fence 2012 may be matched to location 2006 for determination of whether user A 2002 is visiting merchant A 2008. Merchant data 2010 further is associated with payment data 2014 for merchant A 2008, which includes acceptance mechanisms 2016 for merchant A 2008 and merchant device 150.

Using the aforementioned information, acceptance mechanism application 140 determines a matched user-merchant relationship 2018, which includes merchant A and user A 2020. Matched user-merchant relationship 2018 may be determined using user data 2004 and merchant data 2010 as discussed herein, by locating location 2006 within geo-fence 2012. Using matched user-merchant relationship 2018, a selected payment mechanism 2022 may be determined. Selected payment mechanism 2022 may be used to determine payment process 2024, which may configure communication device 110.

Communication device 110 executes a payment application 120 corresponding generally to the specialized hardware and/or software modules and processes described in reference to FIG. 1. In this regard, payment application 120 may be used to process a payment after being configured to interface with merchant device 150 using a payment process determined by transaction management system 130. Thus, payment application 120 includes data for location 2006, which may be transmitted to transaction management system 130. Payment application 120 further includes a configured payment process 2100, which may include application interfaces and communication protocols for providing a payment to merchant device 140. Thus, configured payment process 2100 includes transaction 2102 with merchant device 150 having a cost 2104. Payment application 120 may further be used to provide a token 2106 to merchant device 150 or receive token 2106 from merchant device 150, which may include tokenized data 2108 used for payment processing, such as an identifier associated with a user, merchant, payment instrument, digital wallet, or other identifying information.

Merchant device 150 executes a sales application 152 corresponding generally to the specialized hardware and/or software modules and processes described in reference to FIG. 1. In this regard, sales application 152 may process token 2106 from communication device 110 received using an acceptance mechanism determined by transaction management system 130. In other embodiments, sales application 152 may provide token 2106 to communication device 110 for transaction processing. Thus, sales application 152 includes acceptance mechanisms 2016, which may correspond to payment acceptance mechanisms that may be used with merchant device 150 to process a payment. Information for acceptance mechanisms 2016 may be communicated to transaction management system 130 for use in determining payment process 2024. Moreover, sales application includes transaction 2102 with communication device 120 having cost 2104. Transaction 2102 may be receive a payment instrument and/or be processed through selected acceptance mechanism 2022, and receive transaction results 2200 from transaction processing.

Figure 4:
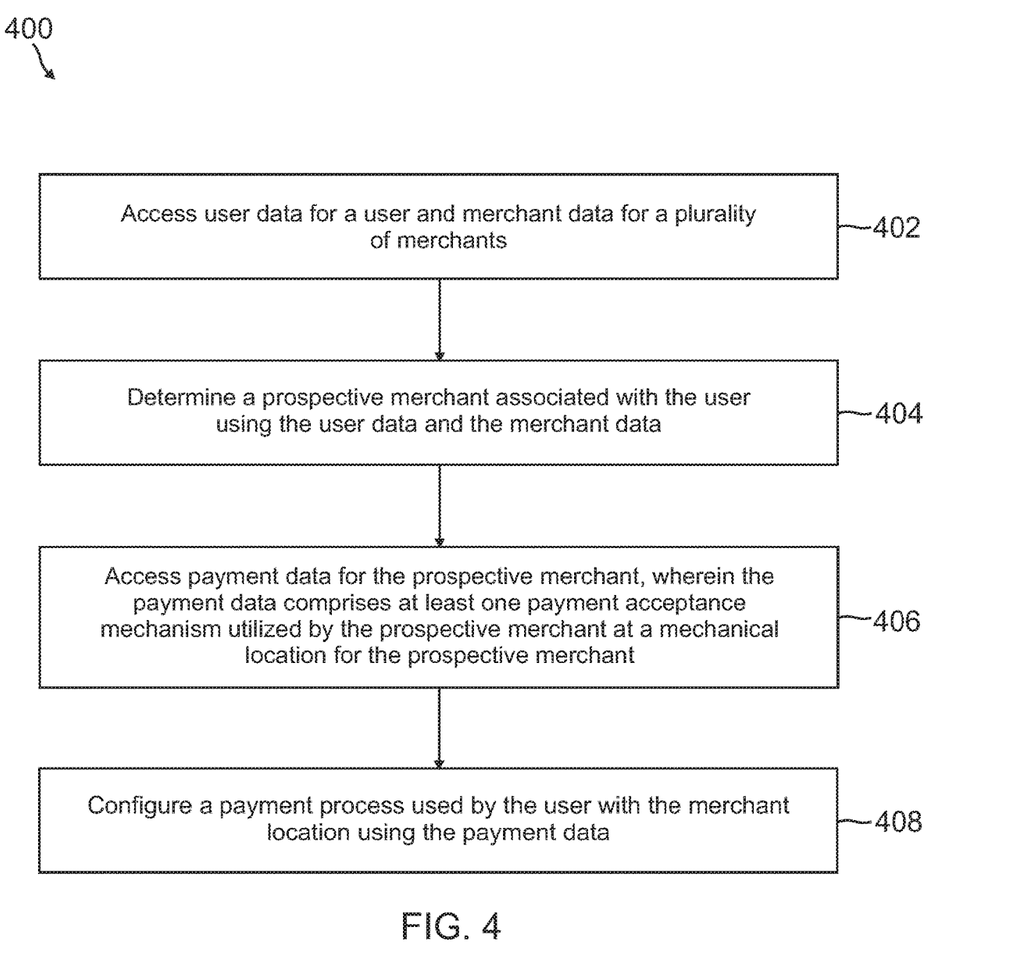
FIG. 4 is an exemplary process flowchart for automatic synchronization of a device for transaction processing based on geo-fenced locations, according to an embodiment.

FIG. 4 is an exemplary process flowchart for automatic synchronization of a device for transaction processing based on geo-fenced locations, according to an embodiment. Note that one or more steps, processes, and methods described herein may be omitted, performed in a different sequence, or combined as desired or appropriate.

At step 402, user data for a user and merchant data for a plurality of merchants is accessed, for example, by a payment provider system that comprises one or more hardware processors coupled to a non-transitory memory. The user data may be generated from user actions by the user. In such embodiments, the user actions are determined by a communication device in possession of the user. For example, the user actions may comprise at least one of locations of the user, online search histories by the user, biometrics of the user, messages sent and received by the user, and financial transactions by the user.

A prospective merchant associated with the user is determined using the user data and the merchant data, at step 404. The user data may comprise a geo-location of the user determined using a GPS locator of a communication device for the user, wherein the prospective merchant is determined using the geo-location of the user. For example, the merchant data may comprise a geo-fenced area for the prospective merchant, wherein the prospective merchant is determined by matching the geo-location and the geo-fenced area. The user data may further comprise past merchant locations visited by the user, wherein the prospective merchant is determined based on the past merchant locations visited by the user. Additionally, the user data may comprise at least one of user preferences set by the user and user information for the user, wherein the merchant data comprises merchant information for the user, wherein the user preferences comprise preferred merchant information for the user, and wherein the user information comprises at least one of personal information for the user and financial information for the user.

At step 406, payment data for the prospective merchant is determined, wherein the payment data comprises at least one payment acceptance mechanism utilized by the prospective merchant at a merchant location for the prospective merchant. The payment data may comprise payment processing devices utilized at the merchant location for the prospective merchant. A payment process used by the user with the prospective merchant location is configured using the payment data, for example, through a payment application of a communication device, at step 408. The payment process may comprise a payment application executing on a communication device for the user. Thus, the payment application may be associated with an online payment provider providing payment services to the user, wherein the user utilizes a payment account with the online payment provider to process payments through the payment application. The payment application may provide a payment to the prospective merchant using the payment process through the at least one payment acceptance mechanism, and wherein the payment process utilizes one of near field communications (NFC) with a merchant device at the merchant location, display of a barcode or QR code on an output display device of the communication device, and location based check-in of the user through the communication device. Thus, the payment process comprises a check-in at the merchant location by the user, wherein the check-in may automatically fill merchant information for the prospective merchant into the payment process in a payment application executing on a communication device of the user. The payment process may further alert the prospective merchant of the user at the merchant location, and wherein the payment process further provides user information for the user to a merchant device at the merchant location.

In various embodiments, a request to change the prospective merchant from the user is received. Additionally, at least one other nearby prospective merchant is determined using the user data and nearby merchant data for the at least one other nearby prospective merchant. In further embodiments, nearby merchant data for at least one nearby merchant is accessed, and at least one other prospective merchant matching the user data is determined using the nearby merchant data. In such embodiments, the at least one other prospective merchant is communicated to a communication device of the user for selection to reconfigure the payment process executed by the communication device. In various embodiments, the payment process further comprises at least one of an advertisement for the prospective user communicated to a communication device of the user and interface graphics of the merchant displayed through an application executing on the communication device of the user.

Figure 5:
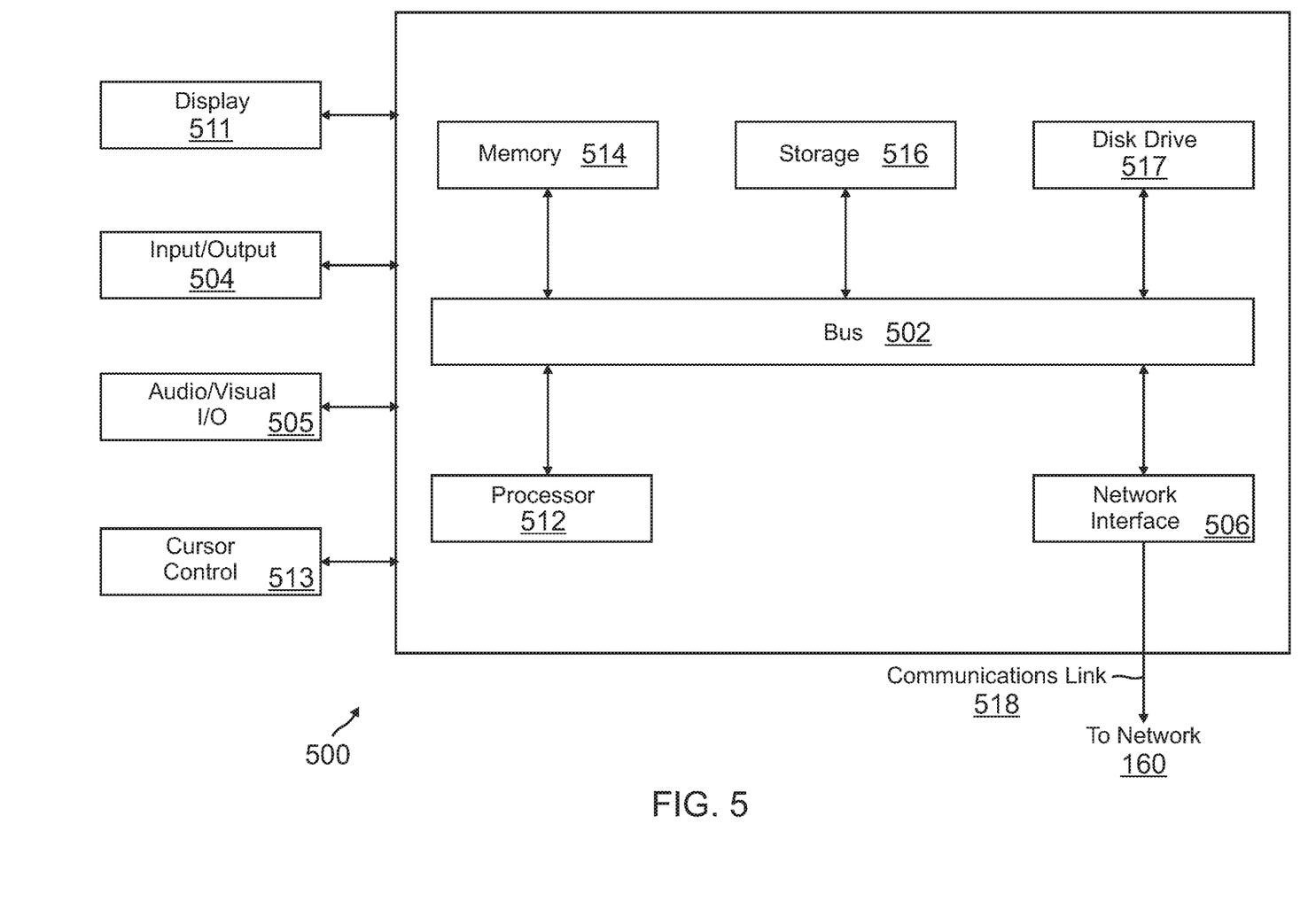
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory comprising instructions; and
one or more hardware processors coupled to the non-transitory memory and configured to read the instructions to cause the system to perform operations comprising:
detecting that a user is located within a first geo-fenced area based on a GPS locator of a user device of the user or based on a determination that the user device has performed a check-in with a merchant, wherein the merchant corresponds to the first geo-fenced area;
in response to detecting that the user is located within the first geo-fenced area:
identifying merchant data of the merchant;
determining, based on the merchant data, a payment acceptance mechanism of a plurality of payment acceptance mechanisms that is supported by a corresponding physical merchant device of the merchant;
alerting the user that the payment acceptance mechanism can be used to process a transaction with the corresponding physical merchant device;
automatically filling information of the merchant into a payment application executing on the user device; and
the payment application processing the transaction.

2. The system of claim 1, the operations further comprising determining that the user is allowed to transact with the merchant based on identifying a past transaction conducted between the user and the merchant.

3. The system of claim 1, wherein the payment acceptance mechanism is a quick response (QR) code, and wherein the alerting includes causing the payment application to display the QR code.

4. The system of claim 1, wherein the operations further comprise causing the payment application to communicate with the corresponding physical merchant device over a short-range wireless communication to provide an electronic tokenized payment to the corresponding physical merchant device.

5. The system of claim 4, wherein the operations further comprise: transmitting, in response to the detecting that the user is located within the first geo-fenced area, an alert to the merchant, the alert informing that the user is at a location of the merchant.

6. The system of claim 1, the operations further comprising:
loading user information of the user onto the corresponding physical merchant device, wherein the user information includes a payment token or information corresponding to a payment instrument of the user.

7. The system of claim 1, the operations further comprising:
providing an offer to the user device for use at a location of the merchant based on determining that the user is located within the first geo-fenced area.

8. A non-transitory machine-readable medium having stored thereon machine-readable instructions executable to cause a machine to perform operations comprising:
detecting that a user is located within a first geo-fenced area based on a GPS locator of a user device of the user or based on a determination that the user device has performed a check-in with a merchant, wherein the merchant corresponds to the first geo-fenced area;
in response to detecting that the user is located within the first geo-fenced area:
identifying merchant data of the merchant;
determining, based on the merchant data, a payment acceptance mechanism of a plurality of payment acceptance mechanisms that is supported by a corresponding physical merchant device of the merchant;
alerting the user that the payment acceptance mechanism can be used to process a transaction with the corresponding physical merchant device; and
automatically filling information of the merchant into a payment application executing on the user device; and
the payment application processing the transaction.

9. The non-transitory machine-readable medium of claim 8, the operations further comprising determining that the user is allowed to transact with the merchant based on identifying a past transaction conducted between the user and the merchant.

10. The non-transitory machine-readable medium of claim 8, wherein the payment acceptance mechanism is a quick response (QR) code, and wherein the alerting includes causing the payment application to display the QR code.

11. The non-transitory machine-readable medium of claim 8, wherein the operations further comprise causing the payment application to communicate with the corresponding physical merchant device over a short-range wireless communication to provide an electronic tokenized payment to the corresponding physical merchant device.

12. The non-transitory machine-readable medium of claim 8, wherein the operations further comprise: transmitting, in response to the detecting that the user is located within the first geo-fenced area, an alert to the merchant, the alert informing that the user is at a location of the merchant.

13. A method, comprising:
detecting that a user is located within a first geo-fenced area based on a GPS locator of a user device of the user or based on a determination that the user device has performed a check-in with a merchant, wherein the merchant corresponds to the first geo-fenced area;
in response to detecting that the user is located within the first geo-fenced area:
identifying merchant data of the merchant;
determining, based on the merchant data, a payment acceptance mechanism of a plurality of payment acceptance mechanisms that is supported by a corresponding physical merchant device of the merchant;
alerting the user that the payment acceptance mechanism can be used to process a transaction with the corresponding physical merchant device; and
automatically filling information of the merchant into a payment application executing on the user device; and
the payment application processing the transaction.

14. The method of claim 13, further comprising determining that the user is allowed to transact with the merchant based on identifying a past transaction conducted between the user and the merchant.

15. The method of claim 13, wherein the payment acceptance mechanism is a quick response (QR) code, and wherein the alerting includes causing the payment application to display the QR code.

16. The method of claim 13, further comprising causing the payment application to communicate with the corresponding physical merchant device over a short-range wireless communication to provide an electronic tokenized payment to the corresponding physical merchant device.

17. The method of claim 13, further comprising:
transmitting, in response to the detecting that the user is located within the first geo-fenced area, an alert to the merchant, the alert informing that the user is at a location of the merchant.

18. The method of claim 13, further comprising:
loading user information of the user onto the corresponding physical merchant device, wherein the user information includes a payment token or information corresponding to a payment instrument of the user.

19. The method of claim 13, further comprising:
providing an offer to the user device for use at a location of the merchant based on determining that the user is located within the first geo-fenced area.

20. The method of claim 15, wherein the corresponding physical merchant device comprises a scanner that scans the QR code.

\* \* \* \* \*